(12) United States Patent
Bickham et al.

(10) Patent No.: US 7,570,857 B1
(45) Date of Patent: Aug. 4, 2009

(54) LOW BEND LOSS DISPERSION SLOPE COMPENSATING OPTICAL FIBER

(75) Inventors: Scott Robertson Bickham, Corning, NY (US); Snigdharaj Kumar Mishra, Wilmington, NC (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 12/151,710

(22) Filed: May 8, 2008

(51) Int. Cl.
*G02B 6/28* (2006.01)
*G02B 6/36* (2006.01)
(52) U.S. Cl. ...................... 385/127; 385/124
(58) Field of Classification Search ........................ None
See application file for complete search history.

(56) References Cited

U.S. PATENT DOCUMENTS

| | | | |
|---|---|---|---|
| 5,838,867 A | 11/1998 | Onishi et al. ................ 385/123 |
| 5,999,679 A * | 12/1999 | Antos et al. ................ 385/127 |
| 6,671,445 B2 | 12/2003 | Bickham et al. ............. 385/127 |
| 6,701,052 B2 | 3/2004 | Berkey et al. ............... 385/126 |
| 6,707,976 B1 | 3/2004 | Gruner-Nielsen et al. ... 385/123 |
| 6,813,430 B2 * | 11/2004 | Aikawa et al. .............. 385/127 |
| 6,959,137 B2 | 10/2005 | Kalish et al. ................ 385/127 |

OTHER PUBLICATIONS

Jeunhomme, Luc B., "Principles and Applications", *Single-Mode Fiber Optics*, Secon Edition, 1990, pp. 39-44.

* cited by examiner

*Primary Examiner*—Omar Rojas
(74) *Attorney, Agent, or Firm*—Matthew J. Mason

(57) ABSTRACT

A dispersion compensating optical waveguide fiber that includes a core region surrounded by and in contact with a clad layer, wherein the respective refractive index profiles of the core region and the clad layer can be selected to provide, at a wavelength of 1550 nm, a total dispersion of less than −25 ps/nm/km and a bend loss of less than 0.25 dB per turn on a 20 mm diameter mandrel. The dispersion compensating optical waveguide fiber can also have an effective area of greater than 25 μm². The dispersion compensating optical waveguide fiber may include a cladding layer having randomly dispersed voids situated therein.

20 Claims, 3 Drawing Sheets

LOW BEND LOSS DISPERSION SLOPE COMPENSATING OPTICAL FIBER

BACKGROUND OF THE INVENTION

1. Field of the Invention

The present invention relates generally to an optical waveguide fiber designed to compensate total dispersion, and particularly to an optical waveguide fiber designed to compensate total dispersion while exhibiting substantially low bend loss at 1550 nm.

2. Technical Background

Dispersion compensation techniques are often desired in telecommunications systems that provide high power transmissions for long distances. Such techniques include the creation of dispersion managed spans, wherein the spans include a transmission fiber having positive dispersion and positive dispersion slope, and a dispersion compensating fiber having negative dispersion and negative dispersion slope at the same wavelength (typically 1550 nm).

In order to reduce non-linear optical effects, such as self-phase modulation, four-wave-mixing, cross-phase modulation, and non-linear scattering processes (all of which can cause degradation of signals in high powered systems) transmission fibers having a large effective area ($A_{eff}$) are typically employed in high power transmissions for long distances. While dispersion compensating fibers used in such systems typically have much smaller effective areas than transmission fibers, reduction of non-linear optical effects can be achieved by increasing the effective area of these fibers as well.

However, an increase in effective area of an optical waveguide fiber typically results in an increase in macrobending induced losses which attenuate signal transmission through a fiber. Such losses become increasingly significant over long (e.g., 100 km, or more) distances (or spacing between regenerators, amplifiers, transmitters and/or receivers). Unfortunately, the larger the effective area of a conventional optical fiber, the higher the macrobend induced losses tend to be.

DEFINITIONS

The "refractive index profile" is the relationship between refractive index or relative refractive index and waveguide fiber radius.

The definitions of the radii used herein are set forth in the figures and the discussion thereof.

Total dispersion, sometimes called chromatic dispersion, of a waveguide fiber is the sum of the material dispersion, the waveguide dispersion, and the inter-modal dispersion. In the case of single mode waveguide fibers the inter-modal dispersion is zero.

The sign convention generally applied to the total dispersion is as follows.

Total dispersion is said to be positive if shorter wavelength signals travel faster than longer wavelength signals in the waveguide. Conversely, in a negative total dispersion waveguide, signals of longer wavelength travel faster.

The effective area is $$A_{eff}=2\pi(\int E^2 r dr)^2/(\int E^4 r dr)$$

where the integration limits are 0 to $\infty$, and E is the electric field associated with light propagated in the waveguide.

The relative refractive index percent, $$\Delta\% = 100 \times (n_i^2 - n_c^2)/2n_i^2$$

where $n_i$ is the maximum refractive index in region i, unless otherwise specified, and $n_c$ is the average refractive index of the outermost cladding region. As used herein, the relative refractive index is represented by $\Delta$ and its values are given in units of "%", unless otherwise specified. In cases where the refractive index of a region is less than the average refractive index of the outermost cladding region, the relative index percent is negative and is referred to as having a depressed region or depressed index, and is calculated at the point at which the relative index is most negative unless otherwise specified. In cases where the refractive index of a region is greater than the average refractive index of the outermost cladding region, the relative index percent is positive and the region can be said to be raised or to have a positive index, and is calculated at the point at which the relative index is most positive unless otherwise specified.

An "updopant" is herein considered to be a dopant which has a propensity to raise the refractive index relative to pure undoped $SiO_2$. A "downdopant" is herein considered to be a dopant which has a propensity to lower the refractive index relative to pure undoped $SiO_2$. An updopant may be present in a region of an optical fiber having a negative relative refractive index when accompanied by one or more other dopants which are not updopants. Likewise, one or more other dopants which are not updopants may be present in a region of an optical fiber having a positive relative refractive index. A downdopant may be present in a region of an optical fiber having a positive relative refractive index when accompanied by one or more other dopants which are not downdopants. Likewise, one or more other dopants which are not downdopants may be present in a region of an optical fiber having a negative relative refractive index.

The term $\alpha$-profile refers to a refractive index profile, expressed in terms of $\Delta(b)$%, where b is radius, which follows the equation, $$\Delta(b)\% = \Delta(b_0)(1-[|b-b_0|/(b_1-b_0)]^\alpha)$$

where $b_0$ is the point at which $\Delta(b)$% is maximum, $b_1$ is the point at which $\Delta(b)$% is zero, and b is in the range $b_i \leq b \leq b_f$, where delta is defined above, $b_i$ is the initial point of the $\alpha$-profile, $b_f$ is the final point of the $\alpha$-profile, and $\alpha$ is an exponent which is a real number.

The theoretical fiber cutoff wavelength, or "theoretical fiber cutoff", or "theoretical cutoff", for a given mode, is the wavelength above which guided light cannot propagate in that mode. A mathematical definition can be found in Single Mode Fiber Optics, Jeunhomme, pp. 39-44, Marcel Dekker, New York, 1990 wherein the theoretical fiber cutoff is described as the wavelength at which the mode propagation constant becomes equal to the plane wave propagation constant in the outer cladding.

The effective fiber cutoff is lower than the theoretical cutoff due to losses that are induced by bending and/or mechanical pressure. In this context, the cutoff refers to the higher of the LP11 and LP02 modes. LP11 and LP02 are generally not distinguished in measurements, but both are evident as steps in the spectral measurement, i.e. no power is observed in the mode at wavelengths longer than the measured cutoff.

The actual fiber cutoff can be measured by the standard 2 m fiber cutoff test, FOTP-80 (EIA-TIA-455-80), to yield the "fiber cutoff wavelength", also known as the "2 m fiber cutoff" or "measured cutoff". The FOTP-80 standard test is performed to either strip out the higher order modes using a controlled amount of bending, or to normalize the spectral response of the fiber to that of a multimode fiber.

The cabled cutoff wavelength, or "cabled cutoff" is typically lower than the measured 2 m fiber cutoff due to effects of bending and mechanical pressure in the cable environment. The actual cabled condition can be approximated by the cabled cutoff test described in the EIA-445 Fiber Optic Test Procedures, which are part of the EIA-TIA Fiber Optics Standards, that is, the Electronics Industry Alliance-Telecommunications Industry Association Fiber Optics Standards, more commonly known as FOTP's. Cabled cutoff measurement is described in EIA-455-170 Cable Cutoff Wavelength of Single-mode Fiber by Transmitted Power, or "FOTP-170".

Unless otherwise noted herein, optical properties (such as dispersion, dispersion slope, etc.) are reported for the LP01 mode. Unless otherwise noted herein, a wavelength of 1550 nm is the reference wavelength.

The mode field diameter (MFD) is measured using the Peterman II method wherein, 2w=MFD, and $w^2=(2\int f^2\, r\, dr/\int [df/dr]^2\, r\, dr)$, the integral limits being 0 to ∞.

"Kappa" or κ is total dispersion divided by total dispersion slope, both at 1550 nm.

"Figure of merit" is dispersion divided by attenuation, both at 1550 nm.

The bend resistance of a waveguide fiber can be gauged by induced attenuation under prescribed test conditions, for example, by deploying or wrapping the fiber around a mandrel of a prescribed diameter. The attenuation induced by the wrapping about the mandrel is typically expressed in dB.

An optical fiber telecommunications link or span is made up of a length of optical waveguide fiber having respective ends adapted to be optically coupled to a transmitter and receiver such that light signals may be propagated therebetween. The length of optical waveguide fiber is generally made up of a plurality of shorter lengths that are spliced or connected together in end to end series arrangement. A span or link may include additional conventional optical components such as optical amplifiers, optical attenuators, optical switches, optical filters, or multiplexing or demultiplexing devices and/or other conventional devices. A group of interconnected links or spans is a telecommunications system.

The "nonlinear power coefficient" or "NPC" is $$\frac{1000\; e^{\alpha_+ L\left(\frac{D_- - D}{D_+ - D_-}\right)}}{A_{\mathit{eff}}^-}$$

where, at a given wavelength (i.e., 1550 nm), D is the average dispersion (in ps/nm/km) of a span having a positive dispersion fiber and a negative dispersion fiber, $D_+$ is the average dispersion (in ps/nm/km) of the positive dispersion fiber in the span, $D_-$ is the average dispersion (in ps/nm/km) of the negative dispersion fiber in the span, $A_{\mathit{eff}}^-$ is the effective area (in μm²) of the negative dispersion fiber in the span, L is the length of the span in kilometers, and $\alpha_+$ is the attenuation of the positive dispersion fiber in the span (obtained by multiplying the attenuation expressed in dB/km by 1 n(10)/10).

SUMMARY OF THE INVENTION

One aspect of the invention is a dispersion compensating optical waveguide fiber that includes a core region surrounded by and in contact with a clad layer, wherein the respective refractive index profiles of the core region and the clad layer are selected to provide, at a wavelength of 1550 nm, a total dispersion of less than −25 ps/nm/km, an effective area of greater than 25 μm², and a bend loss of less than 0.25 dB per turn on a 20 mm diameter mandrel.

In at least one embodiment, the clad layer includes a first annular cladding region, a second annular cladding region surrounding the first annular cladding region, and a third annular cladding region surrounding the second annular cladding region, wherein the second annular cladding region includes silica based glass that, when viewed in cross section, exhibits at least 50 closed randomly dispersed voids situated therein, and (i) mean distance between the voids is less than 5,000 nm, and (ii) at least 80% of the voids have a maximum cross-sectional diameter Di of less than 1,000 nm.

In at least one embodiment, the core region includes a central segment, a first annular segment surrounding the central segment, and a second annular segment surrounding the first annular segment, wherein the central segment has a maximum relative refractive index, $\Delta_{0MAX}$, the first annular segment has a minimum relative refractive index, $\Delta_{1MIN}$, and the second annular segment has a maximum relative refractive index, $\Delta_{2MAX}$, wherein $\Delta_{0MAX} > \Delta_{2MAX} > 0 > \Delta_{1MIN}$.

Another aspect of the invention is a span that includes an optical waveguide fiber having positive total dispersion, wherein the span further includes a dispersion compensating optical waveguide fiber that includes a core region surrounded by and in contact with a clad layer, wherein the respective refractive index profiles of the core region and the clad layer are selected to provide, at a wavelength of 1550 nm, a total dispersion of less than −25 ps/nm/km, an effective area of greater than 25 μm², and a bend loss of less than 0.25 dB per turn on a 20 mm diameter mandrel.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

DETAILED DESCRIPTION OF THE PREFERRED EMBODIMENTS

Figure 1:
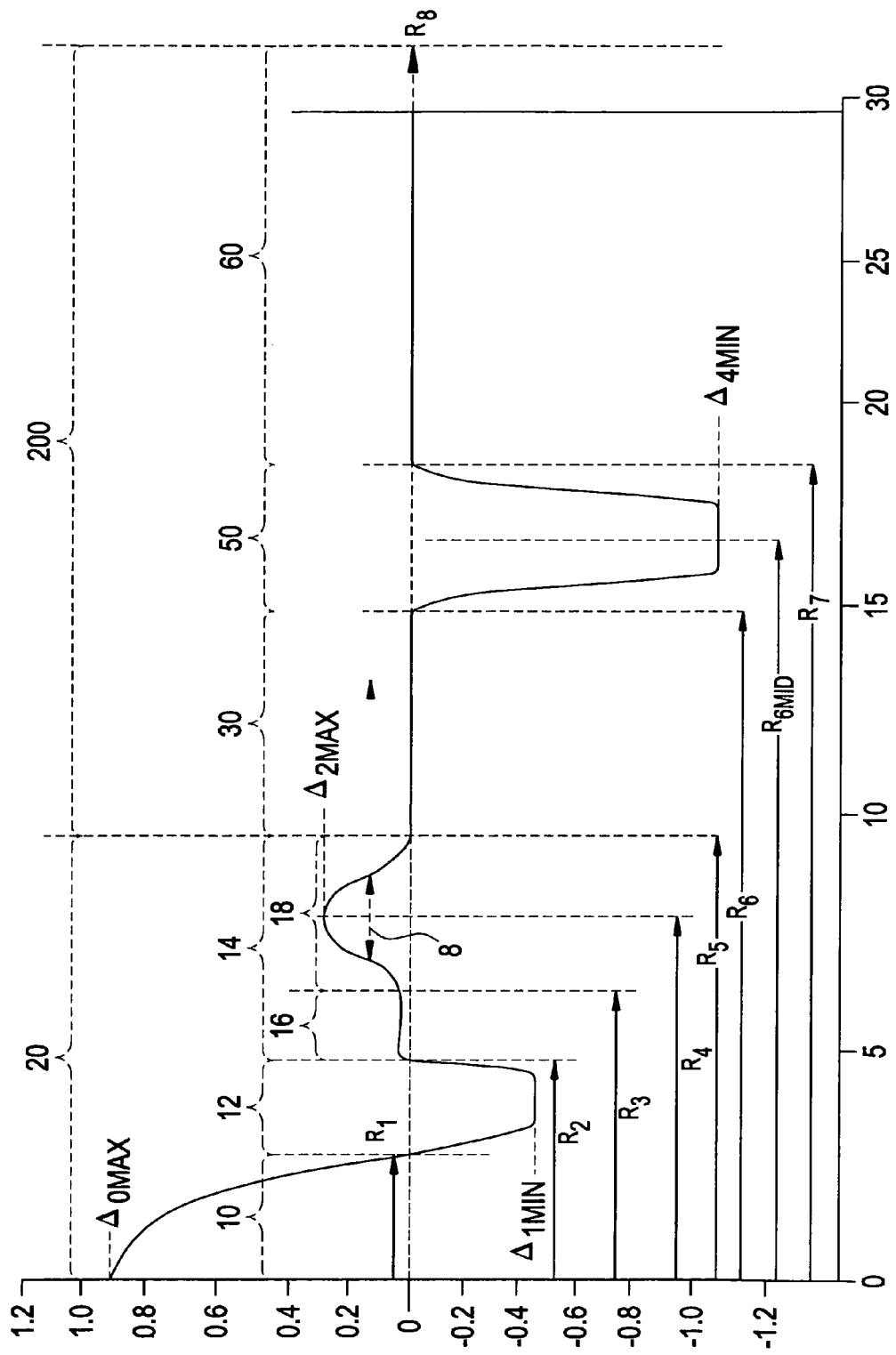
FIG. 1 shows a relative refractive index profile of an embodiment of an optical waveguide fiber as disclosed herein.

Reference will now be made in detail to the present preferred embodiments of the invention, examples of which are illustrated in the accompanying drawings. Whenever possible, the same reference numerals will be used throughout the drawings to refer to the same or like parts.

Figure 2:
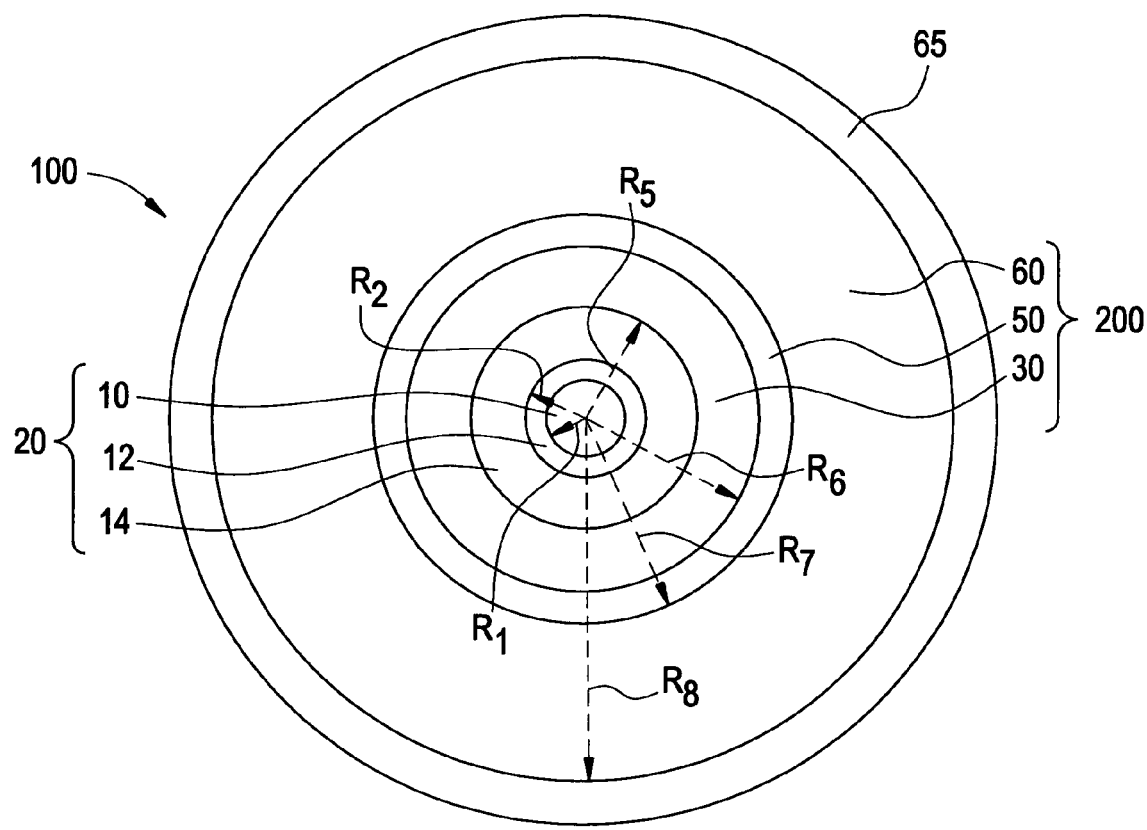
FIG. 2 is a schematic cross-sectional view of an embodiment of an optical waveguide fiber as disclosed herein.
Figure 3:
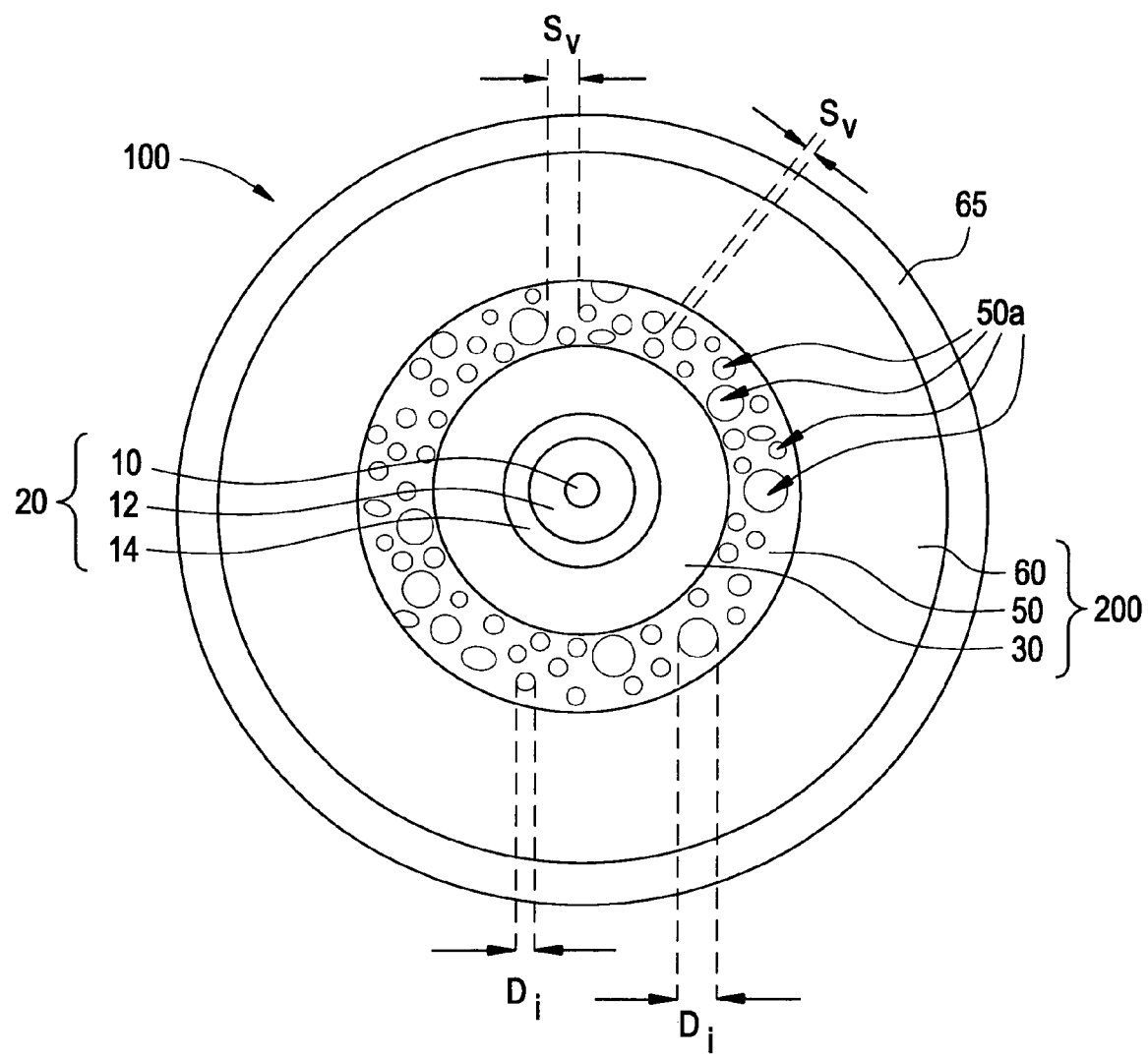
FIG. 3 is a schematic cross-sectional view of another embodiment of an optical waveguide according to the present invention.

Referring to FIGS. 1-3, the optical fiber 100 disclosed herein comprises a segmented core 20 and a cladding layer (or cladding) 200 surrounding and directly adjacent to the core. The core 20 has a refractive index profile, $\Delta_{CORE}(r)$. The cladding 200 has a refractive index profile, $\Delta_{CLAD}(r)$. In some embodiments, the cladding 200 comprises a region of pure silica surrounded by a region containing random voids situated within Si based glass.

FIGS. 1 and 2 show embodiments of a dispersion compensating segmented core optical waveguide fiber. In the illustrated embodiments, segmented core 20 includes central segment 10, first annular segment 12, and second annular segment 14. Central segment 10 has a positive relative refractive index, inner radius zero ($R_0$) and outer radius $R_1$, measured from the profile centerline (all radii are measured relative to the profile centerline) to the point at which the central segment 10 profile crosses the horizontal line defined by $\Delta\% = 0$. First annular segment 12 has a negative relative index, inner radius $R_1$ and outer radius $R_2$ measured to the point at which the ascending leg of segment 12 crosses the horizontal line defined by $\Delta\% = 0$. Second annular segment 14 has an inner radius $R_2$ and an outer radius $R_5$ and includes a flattened region 16 and a raised index region 18. Flattened region 16 has a slightly positive relative index, inner radius $R_2$ and outer radius $R_3$ measured to the point at which the relative index percent begins to increase at the beginning of the rising leg of raised index region 18. Raised index region 18 has inner radius $R_3$ and outer radius $R_5$ measured at the core-clad boundary. Raised index region 18 has maximum relative refractive index at $R_4$. Width 8 is defined as the distance between the respective points of half maximum relative index percent on the ascending and descending leg of raised index region 18.

In some embodiments, at least the central segment 10 and the second annular segment 14 of segmented core 20 comprise silica doped with germanium, i.e., germania doped silica. Dopants other than germanium, singly or in combination, may be employed within at least these segments, and particularly at or near the centerline, of the optical fiber disclosed herein to obtain the desired refractive index and density.

In some embodiments, at least the first annular segment 12 of segmented core 20 comprises silica glass having at least one dopant selected from the group consisting of germanium, aluminum, phosphorus, titanium, boron, and fluorine. In particularly preferred embodiments, first annular segment 12 comprises silica glass having at least one dopant selected from the group consisting of boron and fluorine.

As shown in FIGS. 1 and 2, cladding 200 surrounds and is directly adjacent, i.e., in direct contact with core 20. Cladding 200 includes a first annular cladding region 30 surrounding the core 20 and directly adjacent thereto. First annular cladding region 30 (which preferably has a maximum relative refractive index of less than about 0.05% and a minimum relative refractive index of greater than about −0.05%) has an inner radius of $R_5$ and an outer radius of $R_6$. First annular cladding region 30 is surrounded by second annular cladding region 50. Second annular cladding region 50 has an inner radius $R_6$ and an outer radius $R_7$. In preferred embodiments, $R_6$ is defined to occur where the relative refractive index in cladding 200 first drops below about −0.05% going radially outwardly and $R_7$ is defined to occur where the relative refractive index first goes above about −0.05% going radially outwardly from where it has dropped below −0.05% in second annular cladding region 50. The midpoint of second annular cladding region 50 is $R_{6MID}$. Second annular cladding region 50 is surrounded by a third annular cladding region 60, which extends from $R_7$ to the outer radius of the cladding at $R_8$ and can be optionally surrounded by one or more polymer coatings 65.

In one set of embodiments, depicted in FIGS. 1 and 2, the second annular cladding region 50 comprises silica glass having at least one dopant selected from the group consisting of germanium, aluminum, phosphorus, titanium, boron, and fluorine, wherein the at least one dopant is preferably selected from boron and fluorine. In another set of embodiments (shown, e.g., in FIG. 3), the second annular cladding region 50 comprises silica based glass (either pure silica, or silica doped with for example, germanium, aluminum, phosphorous, titanium, boron and fluorine) with a plurality of closed randomly dispersed voids 50A, the voids 50A being either empty (vacuum) or gas (e.g., argon or air). Such voids can provide an effective refractive index which is low, e.g., compared to pure silica.

The definitions of $R_1$-$R_8$, core segments 10, 12, 14, and cladding regions 30, 50, and 60 apply to each of the refractive index profiles and cross-sectional views disclosed and described herein.

Referring to FIG. 3, segmented core region 20 includes core segments 10, 12, and 14, which is surrounded by first annular cladding region 30, which is situated adjacent to and is surrounded by second annular cladding region 50, which is further surrounded by third annular cladding region 60, which can optionally be surrounded by one or more polymer coatings 65. The relative percent index of refraction ($\Delta n \%$) in the second annular region fluctuates between −28% (index of void filled gas relative to that of silica) and that of the glass surrounding the voids (in this example it is silica, with a relative % index of refraction of about 0%). A typical average relative refractive index of the second annular region 50, as illustrated in FIG. 3, will be between −2% and −3% relative to pure silica glass, depending on the dopants present in the glass surrounding the voids. That is, the index of the second annular region 50 fluctuates in the embodiment illustrated in FIG. 3 and in this embodiment, the width of the gas filled voids, and/or the glass filled spacing $S_V$ between the gas filled voids is randomly distributed and/or are not equal to one another. That is, the voids are non-periodically spaced with respect to one another when viewed in cross-section. It is preferable that the mean distance between the voids is less than 5,000 nm, more preferably less than 2,000 nm, even more preferably less than 1,000 nm. Preferably, at least 80%, and more preferably at least 90% of the voids have a maximum cross-sectional diameter Di of less than 1,000 nm, preferably less than 500 nm. Even more preferably, the mean diameter of the voids is less than 1,000 nm, more preferably less than 500 nm, and even more preferably less than 300 nm. The voids 50A are closed (surrounded by solid material) and are non-periodic. The voids 50A may have the same size, or may be of different sizes. Preferably the second annular cladding region 50 contains at least 50 voids, more preferably at least 100 voids when viewed in cross section, even more preferably at least 200 voids, and still more preferably at least 400 voids.

The second annular region 50 has a profile volume, $V_4$, defined herein as:

$$2\int_{R_6}^{R_7} \Delta_4(r) r \, dr$$

wherein $\Delta_4$ is the relative refractive index of second annular region 50 at radial distance r.

In preferred embodiments, central segment 10 has a maximum relative refractive index percent, $\Delta_{0MAX}$, of greater than 0.6%, such as 0.6%<$\Delta_{0MAX}$<1.2%, further such as 0.7%<$\Delta_{0MAX}$<1.1%, and even further such as 0.8%<$\Delta_{0MAX}$<1.0%. In preferred embodiments, 2.0 µm<$R_1$<4.0 µm, such as 2.2 µm<$R_1$<3.5 µm, and even further such as 2.5 µm<$R_1$<3.0 µm (such that central segment has a width, $W_0$ (i.e., $R_1$-$R_0$), of 2.0 µm<$W_0$<4.0 µm, such as 2.2 µm<$W_0$<3.5 µm, and even further such as 2.5 µm<$W_0$<3.0 µm). In preferred embodiments, first annular segment 12 has a minimum relative refractive index percent, $\Delta_{1MIN}$, of less (i.e., more negative) than −0.2%, such as −0.6%<$\Delta_{1MIN}$<−0.2%, further such as −0.5%<$\Delta_{1MIN}$<−0.3%, and even further such as −0.45%<$\Delta_{1MIN}$<−0.35%. In preferred embodiments, 4.0 µm<$R_2$<7.0 µm, such as 4.5 µm<$R_2$<6.5 µm, and even further such as 5.0 µm<$R_2$<6.0 µm. In preferred embodiments, first annular segment 12 has a width, $W_1$ (i.e., $R_2$-$R_1$), of less than 5 µm, such as 2.0 µm<$W_1$<5.0 µm, and further such as 2.5 µm<$W_1$<4.5 µm, and even further such as 3.0 µm<$W_1$<4.0 µm. In preferred embodiments, flattened region 16 has a maximum relative index percent, $\Delta_{2AMAX}$, of less than 0.1%, such as 0.01%<$\Delta_{2AMAX}$<0.1%, further such as 0.02%<$\Delta_{2AMAX}$<0.08%, and even further such as 0.03%<$\Delta_{2AMAX}$<0.07%. In preferred embodiments, 5.0 µm<$R_3$<8.0 µm, such as 5.5 µm<$R_3$<7.5 µm, and even further such as 6.0 µm<$R_3$<7.0 µm. In a preferred embodiment, flattened region 16 has a width, $W_{2A}$ (i.e., $R_3$-$R_2$), of less than 2.5 µm, such as 0.5 µm<$W_{2A}$<2.5 µm, and further such as 0.7 µm<$W_{2A}$<1.5 µm, and even further such as 0.8 µm<$W_{2A}$<1.2 µm. In preferred embodiments, raised index region 18 has a maximum relative index percent, $\Delta_{2BMAX}$, of greater than 0.1%, such as 0.1%<$\Delta_{2BMAX}$<0.5%, further such as 0.15%<$\Delta_{2BMAX}$<0.4%, and even further such as 0.2%<$\Delta_{2BMAX}$<0.3%. In preferred embodiments, 6.0 µm<$R_4$<10.0 µm, such as 6.5 µm<$R_4$<9.5 µm, and even further such as 7.0 µm<$R_4$<9.0 µm. In preferred embodiments, 7.0 µm<$R_5$<13.0 µm, such as 8.0 µm<$R_5$<12.0 µm, and even further such as 9.0 µm<$R_5$<11.0 µm. In a preferred embodiment, raised index region 18 has a width, $W_{2B}$ (i.e., $R_5$-$R_3$), of less than 5 µm, such as 2.0 µm<$W_{2B}$<5.0 µm, and further such as 2.5 µm<$W_{2B}$<4.5 µm, and even further such as 3.0 µm<$W_{2B}$<4.0 µm. Preferably, width 8 is about half that of raised index region 18, such as from 1.0 to 2.5 µm. In preferred embodiments, second annular segment 14 (i.e., flattened region 16 and raised index region 18) has a maximum relative index percent, $\Delta_{2MAX}$, of greater than 0.1%, such as 0.1%<$\Delta_{2MAX}$<0.5%, further such as 0.15%<$\Delta_{2MAX}$<0.4%, and even further such as 0.2%<$\Delta_{2MAX}$<0.3%. In preferred embodiments, second annular segment 14 has a width, $W_2$ (i.e., $R_5$-$R_2$), of less than 7.5 µm, such as 2.5 µm<$W_2$<7.5 µm, and further such as 3.0 µm<$W_2$<6.0 µm, and even further such as 3.5 µm<$W_2$<5.0 µm.

Included in the above are embodiments wherein 2.0 µm<$W_0$<4.0 µm, 0.6%<$\Delta_{0MAX}$<1.2%, 2.0 µm<$W_1$<5.0 µm, −0.6%<$\Delta_{1MIN}$<−0.2%, 2.5 µm<$W_2$<7.5 µm, and 0.1%<$\Delta_{2MAX}$<0.5%.

In a preferred embodiment, 0.25<$R_1$/$R_2$<0.75, such as 0.35<$R_1$/$R_2$<0.65, and further such as 0.45<$R_1$/$R_2$<0.55. In a preferred embodiment, 0.4<$R_2$/$R_4$<0.8, such as 0.45<$R_2$/$R_4$<0.75, and further such as 0.5<$R_2$/$R_4$<0.7. In a preferred embodiment, 0.15<$R_1$/$R_5$<0.5, such as 0.2<$R_1$/$R_5$<0.4, and further such as 0.25<$R_1$/$R_5$<0.3.

Preferably, first annular cladding region 30 has a maximum relative index percent, $\Delta_{3MAX}$, of less than 0.05% and a minimum relative index percent, $\Delta_{3MIN}$, of greater than −0.05%. Preferably, 10 µm<$R_6$<30 µm, such as 12 µm<$R_6$<25 µm, and further such as 15 µm<$R_6$<20 µm. Preferably, first annular cladding region 30 has a width, $W_3$ (i.e., $R_6$-$R_5$), of greater than 3 µm, such as 3 µm<$W_3$<20 µm, and further such as 4 µm<$W_3$<15 µm, and even further such as 5 µm<$W_3$<10 µm. Preferably, second annular cladding region 50 has a minimum relative refractive index percent, $\Delta_{4MIN}$, of less than (i.e., more negative than) −0.3%, more preferably less than −0.45%, and even more preferably less than −0.7%. Preferably, 12 µm<$R_7$<40 µm, such as 15 µm<$R_7$<30 µm, and further such as 18 µm<$R_7$<25 µm. Preferably, second annular cladding region 50 has a width $W_4$ (i.e., $R_7$-$R_6$), of less than 10 µm, such as 2.0 µm<$W_4$<10.0 µm, and further such as 2.5 µm<$W_4$<7.5 µm, and even further such as 3.0 µm<$W_4$<5.0 µm. Preferably, the absolute magnitude of the profile volume, |$V_4$|, of the second annular cladding region 50 is greater than 20%-µm$^2$, such as 20%-µm$^2$<|$V_4$|<250% µm$^2$, and further such as 30%-µm$^2$<|$V_4$|<225%-µm$^2$, and even further such as 40%-µm$^2$<|$V_4$|<200%-µm$^2$, and yet even further such as 50%-µm$^2$<|$V_4$|<160%-µm$^2$, including 60%-µm$^2$, 70%-µm$^2$, 80%-µm$^2$, 90%-µm$^2$, 100%-µm$^2$, 110%-µm$^2$, 120%-µm$^2$, 130%-µm$^2$, 140%-µm$^2$, or 150%-µm$^2$.

Preferably, 0.2<$R_5$/$R_6$<0.8, such as 0.25<$R_5$/$R_6$<0.75, and further such as 0.3<$R_5$/$R_6$<0.7, and even further such as 0.35<$R_5$/$R_6$<0.65. Preferably, 0.15<$R_5$/$R_7$<0.75, such as 0.2<$R_5$/$R_7$<0.7, and further such as 0.25<$R_5$/$R_7$<0.65, and even further such as 0.3<$R_5$/$R_7$<0.6.

Preferably $R_8$ is greater than 50 µm, such as 50 µm<$R_8$<100 µm, and further such as 60 µm<$R_8$<90 µm.

Preferably, optical fibers disclosed herein provide, at a wavelength of 1550 nm, a total dispersion of less than −25 ps/nm/km, more preferably less than −35 ps/nm/km, and even more preferably less than −45 ps/nm/km. Preferably, optical fibers disclosed herein provide, at a wavelength of 1550 nm, an effective area of greater than 25 µm$^2$, more preferably greater than 30 µm$^2$, even more preferably greater than 35 µm$^2$, and yet even more preferably greater than 40 µm$^2$. Preferably, optical fibers disclosed herein provide, at a wavelength of 1550 nm, a bend loss of less than 0.25 dB per turn on a 20 mm diameter mandrel, more preferably less than 0.20 dB per turn on a 20 mm diameter mandrel, even more preferably less than 0.15 dB per turn on a 20 mm diameter mandrel, and yet even more preferably less than 0.10 dB per turn on a 20 mm diameter mandrel.

Preferably, optical fibers disclosed herein provide, at a wavelength of 1550 nm, an attenuation of less than 0.25 dB/km, more preferably less than 0.24 dB/km, and even more preferably less than 0.23 dB/km. Preferably, optical fibers disclosed herein provide a core alpha value of less than 3.0, such as from 1.0 to 3.0, and further such as from 1.5 to 2.5. Preferably optical fibers disclosed herein provide a cable cutoff of less than 1500 nm, such as from 1300 nm to 1500 nm or from 1300 to 1450 nm.

Preferably, optical fibers disclosed herein provide, at a wavelength of 1550 nm, a dispersion slope of less than (i.e., more negative than) −0.1 ps/nm$^2$/km. Preferably, optical fibers disclosed herein provide, at a wavelength of 1550 nm, a kappa value of between 250 and 350 nm. Preferably, optical fibers disclosed herein provide, at a wavelength of 1550 nm, a figure of merit of less than −150 ps/nm-dB, more preferably less than −175 ps/nm-dB, and even more preferably less than −200 ps/nm-dB.

One set of preferred embodiments includes optical fiber wherein the refractive index profile is selected to provide 0.80%<$\Delta_{0MAX}$<1.05%, −0.50%<$\Delta_{1MIN}$<−0.25%, 12 µm<$R_6$<18 µm, 2.0 µm<$W_4$<5.0 µm, and, at a wavelength of 1550 nm, −60 ps/nm/km<total dispersion<−30 ps/nm/km, 25 µm$^2$<effective area<50 µm$^2$, and 0.02 dB<bend loss/turn on a 20 mm diameter mandrel<0.20 dB. Preferably, in such embodiments, 2.5 µm<$W_0$<3.0 µm, 2.0 µm<$W_1$<3.0 µm, 0.25%<$\Delta_{2MAX}$<0.35%, 2.5 µm<$W_2$<5.0 µm, 7.0 µm<$R_4$<9.0

μm, and, at a wavelength of 1550 nm, attenuation is less than 0.25 dB/km, −0.200 ps/nm²/km<dispersion slope<−0.100 ps/nm²/km, and 250 nm<kappa<350 nm.

Another set of preferred embodiments includes optical fiber wherein the refractive index profile is selected to provide 1.0%<$\Delta_{0MAX}$<1.2%, −0.50%<$\Delta_{1MIN}$<−0.25%, 12 μm<$R_6$<18 μm, 2.0 μm<$W_4$<5.0 μm, and, at a wavelength of 1550 nm, −70 ps/nm/km<total dispersion<−45 ps/nm/km, 25 μm²<effective area<50 μm², and 0.02 dB<bend loss/turn on a 20 mm diameter mandrel<0.20 dB. Preferably, in such embodiments, 2.5 μm<$W_0$<3.0 μm, 2.0 μm<$W_1$<3.0 μm, 0.25%<$\Delta_{2MAX}$<0.35%, 2.5 μm<$W_2$<5.0 μm, 7.0 μm<$R_4$<9.0 μm, and, at a wavelength of 1550 nm, attenuation is less than 0.25 dB/km, −0.250 ps/nm²/km<dispersion slope<−0.150 ps/nm²/km, and 250 nm<kappa<350 nm.

Another set of preferred embodiments includes optical fiber wherein the refractive index profile is selected to provide 0.6%<$\Delta_{0MAX}$<0.8%, −0.50%<$\Delta_{1MIN}$<−0.25%, 15 μm<$R_6$<25 μm, 2.0 μm<$W_4$<5.0 μm, and, at a wavelength of 1550 nm, −25 ps/nm/km<total dispersion<−50 ps/nm/km, 40 μm²<effective area<60 μm², and 0.02 dB<bend loss/turn on a 20 mm diameter mandrel<0.20 dB. Preferably, in such embodiments, 2.5 μm<$W_0$<3.5 μm, 2.0 μm<$W_1$<3.0 μm, 0.15%<$\Delta_{2MAX}$<0.30%, 2.5 μm<$W_2$<5.0 μm, 7.5 μm<$R_4$<10.0 μm, and, at a wavelength of 1550 nm, attenuation is less than 0.25 dB/km, −0.150 ps/nm²/km<dispersion slope<−0.100 ps/nm²/km, and 250 nm<kappa<350 nm.

EXAMPLES

The invention will be further clarified by the following examples.

Example 1

Table 1 lists characteristics of modeled refractive index profiles of illustrative examples A-G, each of which resembles the profile shown in FIG. 1. In each of these examples, second annular region (shown as 50 in FIG. 1) is modeled as having an average relative refractive index of about −1%.

TABLE 1

| Example | A | B | C | D | E | F | G |
|---|---|---|---|---|---|---|---|
| $\Delta_{0MAX}$(%) | 1.068 | 1.032 | 1.113 | 0.989 | 1.106 | 1.051 | 1.023 |
| $R_1$ (μm) | 2.513 | 2.599 | 2.467 | 2.625 | 2.477 | 2.468 | 2.557 |
| $\Delta_{1MIN}$(%) | −0.387 | −0.391 | −0.415 | −0.393 | −0.383 | −0.396 | −0.421 |
| $\Delta_{2MAX}$(%) | 0.266 | 0.265 | 0.271 | 0.268 | 0.263 | 0.279 | 0.255 |
| $R_4$ (μm) | 7.421 | 7.583 | 7.333 | 7.303 | 7.452 | 7.524 | 7.429 |
| $W_2$ (μm) | 3.56 | 3.95 | 3.26 | 3.33 | 3.33 | 3.75 | 3.36 |
| Core Alpha | 1.71 | 1.79 | 1.75 | 1.79 | 1.63 | 1.86 | 1.77 |
| $W_1$ (μm) | 2.89 | 2.72 | 2.66 | 2.85 | 2.88 | 2.72 | 2.68 |
| $R_6$ (μm) | 15.57 | 15.02 | 15.01 | 15.54 | 15.42 | 15.37 | 14.69 |
| $W_4$ (μm) | 3.00 | 3.00 | 3.00 | 3.00 | 3.00 | 3.00 | 3.00 |
| $|V_4|$ (%-μm²) | 102.4 | 99.1 | 99.1 | 101.2 | 102.5 | 107.0 | 97.2 |

Table 2 lists modeled optical properties of illustrative examples A-G.

TABLE 2

| Example | A | B | C | D | E | F | G |
|---|---|---|---|---|---|---|---|
| Dispersion at 1550 nm (ps/nm/km) | −52.5 | −42.5 | −57.5 | −42.1 | −52.6 | −58.0 | −50.4 |
| Slope at 1550 nm (ps/nm²/km) | −0.193 | −0.160 | −0.197 | −0.151 | −0.195 | −0.216 | −0.169 |
| Kappa at 1550 nm (nm) | 272 | 266 | 292 | 279 | 270 | 268 | 298 |
| Aeff at 1550 nm (μm²) | 31.1 | 30.2 | 30.1 | 31.8 | 30.4 | 31.4 | 31.7 |
| MFD at 1550 nm (μm) | 6.21 | 6.17 | 6.09 | 6.31 | 6.16 | 6.21 | 6.26 |
| Cable Cutoff (nm) | 1375 | 1408 | 1410 | 1340 | 1334 | 1380 | 1320 |
| Attenuation at 1550 nm (dB/km) | 0.238 | 0.235 | 0.238 | 0.232 | 0.241 | 0.238 | 0.233 |
| Bend loss/turn at 20 mm diameter at 1550 nm | 0.09 | 0.06 | 0.07 | 0.09 | 0.10 | 0.11 | 0.12 |
| Nonlinear power coefficient | 6.96 | 7.98 | 6.89 | 7.62 | 7.13 | 6.57 | 6.96 |

Example 2

Table 3 lists characteristics of modeled refractive index profiles of illustrative examples H-K each of which resembles the profile shown in FIG. 1. In each of these examples, second annular region (shown as 50 in FIG. 1) is modeled as having an average relative refractive index of about −1%.

TABLE 3

| | Example | | | |
|---|---|---|---|---|
| | H | I | J | K |
| $\Delta_{0MAX}$(%) | 0.888 | 0.720 | 0.670 | 0.680 |
| $R_1$ (μm) | 2.909 | 3.000 | 3.050 | 3.000 |
| $\Delta_{1MIN}$(%) | −0.430 | −0.380 | −0.380 | −0.350 |
| $\Delta_{2MAX}$(%) | 0.280 | 0.240 | 0.190 | 0.190 |
| $R_4$ (μm) | 8.097 | 8.8 | 8.8 | 8.8 |
| $W_2$ (μm) | 3.55 | 3.7 | 3.6 | 3.8 |
| Core Alpha | 1.65 | 2.08 | 2.03 | 2.03 |
| $W_1$ (μm) | 2.68 | 3.2 | 3.1 | 3.0 |
| $R_6$ (μm) | 14.01 | 15.10 | 19.55 | 20.30 |
| $W_4$ (μm) | 3.40 | 3.50 | 3.40 | 3.45 |
| $|V_4|$ (%-μm$^2$) | 107.0 | 118.0 | 144.5 | 152.0 |

Table 4 lists modeled optical properties of illustrative examples H-K.

TABLE 4

| | Example | | | |
|---|---|---|---|---|
| | H | I | J | K |
| Dispersion at 1550 nm (ps/nm/km) | −33.4 | −29.3 | −41.3 | −38.0 |
| Slope at 1550 nm (ps/nm$^2$/km) | −0.119 | −0.111 | −0.119 | −0.124 |
| Kappa at 1550 nm (nm) | 281 | 265 | 346 | 306 |
| Aeff at 1550 nm (μm$^2$) | 35.0 | 41.5 | 51.8 | 49.6 |
| MFD at 1550 nm (μm) | 6.58 | 7.09 | 7.70 | 7.64 |
| Cable Cutoff (nm) | 1395 | 1474 | 1459 | 1465 |
| Attenuation at 1550 nm (dB/km) | 0.227 | 0.222 | 0.222 | 0.221 |
| Bend loss/turn at 20 mm diameter at 1550 nm | 0.10 | 0.13 | 0.23 | 0.20 |
| Nonlinear power coefficient (NPC) | 7.86 | 7.16 | 4.73 | 5.17 |

In these examples, the most negative dispersion values (i.e., less than −40 ps/nm/km at 1550 nm) were obtained when $\Delta_{0MAX}$ was greater than 1.0% and $R_6$ was less than or equal to about 15 μm. Conversely, the largest effective areas (i.e., greater than 40 μm$^2$ at 1550 nm) were obtained when $\Delta_{0MAX}$ was less than 0.8% and $R_6$ was greater than or equal to about 20 μm.

The bending losses may be minimized by choosing: (i) the proper location of the second annular cladding region 50 and (ii) proper values of the volume of the second annular cladding region 50, which volume is defined as the product of the cross sectional area of the second annular region's sectional area and the absolute value of delta $\Delta_{4min}$ in percent. To minimize the bend losses, it is preferable that the absolute value of the volume $|V_4|$ be greater than about 20%-μm$^2$, more preferably greater than 40%-μm$^2$, and even more preferably greater than 60%-μm$^2$. The volume of the second annular cladding region 50 affects the fiber and cable cutoff wavelengths. To have a cable cutoff wavelength less than 1500 nm, it is preferable that the absolute value of the volume $|V_4|$ of the second annular region 50 be less than about 120%-μm$^2$. This condition yields a cable cutoff that is approximately equal to the theoretical cutoff of the core. If the volume $|V_4|$ of the second annular region is greater than about 120%-μm$^2$, the cable cutoff wavelength may be greater than the theoretical cutoff or even longer than 1550 nm.

As discussed above, second annular cladding region 50 can be formed either by down doping (e.g. by use of fluorine dopant) or by having a plurality of gas filled voids (e.g. air filled voids) imbedded in the second annular cladding region 50. The bending performance calculated in Tables 2 and 4 is based on the use of the effective refractive index in the second annular region. Therefore, bending properties are applicable to both types of optical fiber (i.e., fiber that is fluorine doped, or that has voids in the region 50).

The nonlinear power coefficient (NPC) relates to the optical power entering a dispersion compensating optical fiber (i.e., negative dispersion fiber) of a dispersion managed or hybrid span (i.e., a span having a negative dispersion fiber and a positive dispersion fiber). The values for NPC shown in Tables 2 and 4 assume that at 1550 nm, the attenuation of the positive dispersion fiber is 0.19 dB/km, the dispersion of the positive dispersion fiber is 19 ps/nm/km, and that the span has a length of 50 kilometers an average dispersion of −2.5 ps/nm/km. As can be seen from Tables 1-4, the respective refractive index profiles of the negative dispersion fiber are selected to provide, at a wavelength of 1550 nm, a total dispersion of less than −25 ps/nm/km, an effective area of greater than 25 μm$^2$, and a bend loss of less than 0.25 dB per turn on a 20 mm diameter mandrel. Preferably, the respective refractive index profiles of the negative dispersion fiber are selected to provide, at a wavelength of 1550 nm, a total dispersion of less than −35 ps/nm/km, an effective area of greater than 35 μm$^2$, and a bend loss of less than 0.20 dB per turn on a 20 mm diameter mandrel. Preferably, the respective index profiles of the negative dispersion fiber are selected to provide a NPC of less than 8 μm$^{-2}$, such as less than 7 μ$^{-2}$, and further such as less than 6 μm$^{-2}$ when the span has a length of less than or equal to about 50 kilometers and the positive dispersion fiber has, at a wavelength of 1550 nm, an attenuation of less than 0.2 dB/km, and a total dispersion of at least 15 ps/mn/km.

Embodiments as disclosed herein can provide dispersion compensating optical waveguide fibers having a larger magnitude of negative dispersion thereby enabling the relative length of a positive dispersion fiber in a dispersion managed or hybrid span to have a greater length relative to the length of the dispersion compensating optical fiber (i.e., negative dispersion fiber) of the span. For example, the ratio of the length of the positive dispersion fiber in the span to the negative dispersion fiber in the span can be greater than or equal to 1:1, such as from 1:1 to 2:1, and further such as from 1:1 to 3:1, and even further such as from 1:1 to 4:1. This can allow the span to have overall improved attenuation characteristics. For example, embodiments as disclosed herein can provide spans wherein the length weighted average attenuation of the positive dispersion fiber and the negative dispersion fiber in the span (i.e., length of the positive dispersion fiber×average dispersion of the positive dispersion fiber×length of the negative dispersion fiber×average dispersion of the negative dispersion fiber divided by the total length of both the positive and negative dispersion fibers in the span) is less than 0.21 dB/km, such as less than 0.20 dB/km.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. A dispersion compensating optical waveguide fiber comprising:
a core region surrounded by and in contact with a clad layer, the core region and the clad layer having respective refractive index profiles; wherein,
the respective refractive index profiles are selected to provide an optical waveguide fiber having, at a wavelength of 1550 nm, a total dispersion of less than 45 ps/nm/km, an effective area of greater than 25 $\mu m^2$, an attenuation of less than 0.25 dB/km, and a bend loss of less than 0.25 dB per turn on a 20 mm diameter mandrel.

2. The dispersion compensating optical waveguide fiber of claim 1, wherein the respective refractive index profiles are selected to provide an optical waveguide fiber having, at a wavelength of 1550 nm, an effective area of greater than 40 $\mu m^2$.

3. The dispersion compensating optical waveguide fiber of claim 1, wherein the respective refractive index profiles are selected to provide an optical waveguide fiber having, at a wavelength of 1550 nm, a bend loss of less than 0.10 dB per turn on a 20 mm diameter mandrel.

4. The dispersion compensating optical waveguide fiber of claim 1, wherein the respective refractive index profiles are selected to provide an optical waveguide fiber having, at a wavelength of 1550 nm, a kappa value of between 250 and 350 nm.

5. The dispersion compensating optical waveguide fiber of claim 1, wherein the respective refractive index profiles are selected to provide an optical waveguide fiber having, at a wavelength of 1550 nm, a figure of merit of less than −150 ps/nm-dB.

6. The dispersion compensating optical waveguide fiber of claim 1, wherein the clad layer comprises:
a first annular cladding region extending from a radius $R_5$ to a radius $R_6$, the first annular cladding region comprising a radial width, $W_3=R_6-R_5$;
a second annular cladding region surrounding the first annular cladding region and extending from a radius $R_6$ to a radius $R_7$, the second annular cladding region comprising a radial width, $W_4=R_7-R_6$; and
a third annular cladding region surrounding the second annular cladding region and extending from the radius $R_7$ to an outermost glass radius $R_8$;
wherein said second annular cladding region comprises silica based glass with at least 50 closed randomly dispersed voids situated therein, and (i) mean distance between the voids is less than 5,000 nm, and (ii) at least 80% of the voids have a maximum cross-sectional diameter Di of less than 1,000 nm.

7. A span comprising:
an optical waveguide fiber having positive total dispersion; and
a dispersion compensating optical waveguide fiber according to claim 1.

8. The span of claim 7, wherein the respective refractive index profiles are selected to provide a dispersion compensating optical waveguide fiber having, at a wavelength of 1550 nm, an effective area of greater than 35 $\mu m^2$, and a bend loss of less than 0.20 dB per turn on a 20 mm diameter mandrel.

9. The span of claim 7, wherein the length weighted average attenuation of the optical waveguide fiber having positive total dispersion and the dispersion compensating optical waveguide fiber is less than 0.21 dB/km.

10. The span of claim 7, wherein the clad layer comprises:
a first annular cladding region extending from a radius $R_5$ to a radius $R_6$, the first annular cladding region comprising a radial width, $W_3=R_6-R_5$;
a second annular cladding region surrounding the first annular cladding region and extending from a radius $R_6$ to a radius $R_7$, the second annular cladding region comprising a radial width, $W_4=R_7-R_6$; and
a third annular cladding region surrounding the second annular cladding region and extending from the radius $R_7$ to an outermost glass radius $R_8$;
wherein said second annular cladding region comprises silica based glass with at least 50 closed randomly dispersed voids situated therein, and (i) mean distance between the voids is less than 5,000 nm, and (ii) at least 80% of the voids have a maximum cross-sectional diameter Di of less than 1,000 nm.

11. The dispersion compensating optical waveguide fiber of claim 1, having a core alpha value of less than 3.0.

12. A dispersion compensating optical waveguide fiber comprising:
a core region surrounded by and in contact with a clad layer, the core region and the clad layer having respective refractive index profiles; wherein the core region comprises:
a central segment extending from a centerline ($R_0$) to a radius $R_1$, the central segment comprising a radial width, $W_0=R_1-R_0$;
a first annular segment surrounding the central segment and extending from the radius $R_1$ to a radius $R_2$, the first annular segment comprising a radial width, $W_1=R_2-R_1$; and
a second annular segment surrounding the first annular segment and extending from the radius $R_2$ to a radius $R_5$, the second annular segment comprising a radial width, $W_2=R_5-R_2$; wherein,
said central segment has a maximum relative refractive index, $\Delta_{0MAX}$, said first annular segment has a minimum relative refractive index, $\Delta_{1MIN}$, and said second annular segment has a maximum relative refractive index, $\Delta_{2MAX}$, wherein $\Delta_{0MAX}>\Delta_{2MAX}>0>\Delta_{1MIN}$, and
wherein the clad layer comprises:
a first annular cladding region extending from the radius $R_5$ to a radius $R_6$, the first annular cladding region comprising a radial width, $W_3=R_6-R_5$;
a second annular cladding region extending from a radius $R_6$ to a radius $R_7$, the second annular cladding region comprising a radial width, $W_4=R_7-R_6$;
a third annular cladding region surrounding the second annular cladding region and extending from the radius $R_7$ to an outermost glass radius $R_8$;
wherein said second annular cladding region comprises a volume $V_4$, equal to:

$$2\int_{R_6}^{R_7} \Delta_4(r)r\,dr;$$

wherein 2.2 μm<$W_0$<3.5 μm and the absolute magnitude of $V_4$ is at least 20%-μm$^2$; and the respective refractive index profiles are further selected to provide an optical waveguide fiber having, at a wavelength of 1550 nm, a total dispersion of less than −25 ps/nm/km and a bend loss of less than 0.25 dB per turn on a 20 mm diameter mandrel.

13. The dispersion compensating optical waveguide fiber of claim 12, wherein the respective refractive index profiles are selected to provide an optical waveguide fiber having, at a wavelength of 1550 nm, an effective area of greater than 25 μm$^2$.

14. The dispersion compensating optical waveguide fiber of claim 12, wherein the respective refractive index profiles are selected to provide an optical waveguide fiber having, at a wavelength of 1550 nm, an attenuation of less than 0.25 dB/km.

15. The dispersion compensating optical waveguide fiber of claim 12, wherein the respective refractive index profiles are selected to provide an optical waveguide fiber having, at a wavelength of 1550 nm, a total dispersion of less than −45 ps/nm/km.

16. The dispersion compensating optical waveguide fiber of claim 12, wherein the respective refractive index profiles are selected to provide an optical waveguide fiber having, at a wavelength of 1550 nm, a bend loss of less than 0.10 dB per turn on a 20 mm diameter mandrel.

17. The dispersion compensating optical waveguide fiber of claim 12, wherein 2.5 μm<$W_0$<3.0 μm, 0.6%<$\Delta_{0MAX}$<1.2%, 2.0 μm<$W_1$<5.0 μm, −0.6%<$\Delta_{1MIN}$<−0.2%, 2.5 μm<$W_2$<7.5 μm, and 0.1%<$\Delta_{2MAX}$<0.5%.

18. The dispersion compensating optical waveguide fiber of claim 12, wherein the second annular region comprises silica based glass with at least 50 closed randomly dispersed voids situated therein, and (i) mean distance between the voids is less than 5,000 nm, and (ii) at least 80% of the voids have a maximum cross-sectional diameter Di of less than 1,000 nm.

19. The dispersion compensating optical waveguide fiber of claim 12, having a core alpha value of less than 3.0.

20. A dispersion compensating optical waveguide fiber comprising:
 a core region surrounded by and in contact with a clad layer, the core region and the clad layer having respective refractive index profiles; wherein,
 the respective refractive index profiles are selected to provide an optical waveguide fiber having, at a wavelength of 1550 nm, a total dispersion of less than −25 ps/nm/km, an effective area of greater than 35 μm$^2$, an attenuation of less than 0.25 dB/km, and a bend loss of less than 0.25 dB per turn on a 20 mm diameter mandrel.

* * * * *